United States Patent [19]

Reese

[11] Patent Number: 5,564,588
[45] Date of Patent: Oct. 15, 1996

[54] METHOD AND STORAGE TANK SYSTEM FOR ABOVEGROUND STORAGE OF FLAMMABLE LIQUIDS

[75] Inventor: R. Allan Reese, Seattle, Wash.

[73] Assignee: Ace Tank & Equipment Company, Seattle, Wash.

[21] Appl. No.: 747,994

[22] Filed: Aug. 21, 1991

Related U.S. Application Data

[63] Continuation-in-part of Ser. No. 587,019, Sep. 21, 1990, Pat. No. 5,251,473.

[51] Int. Cl.$^6$ ..................................................... B65D 25/18
[52] U.S. Cl. ............................................. 220/565; 220/444
[58] Field of Search ................................... 220/565, 444, 220/445, 553

[56] References Cited

U.S. PATENT DOCUMENTS

| | | | |
|---|---|---|---|
| 3,848,765 | 11/1974 | Dürkop | 220/469 X |
| 3,942,331 | 3/1976 | Newman, Jr. et al. | 220/444 X |
| 4,895,272 | 1/1990 | De Benedittis et al. | 220/565 X |
| 4,986,436 | 1/1991 | Bambacigno et al. | 220/565 X |
| 4,991,613 | 2/1991 | Kaminski et al. | 220/565 X |
| 5,038,456 | 8/1991 | McGarvey | 220/445 X |
| 5,071,166 | 12/1991 | Marino | 220/445 X |
| 5,081,761 | 1/1992 | Rinehart et al. | 220/444 X |
| 5,102,005 | 4/1992 | Trussler | 220/565 X |
| 5,103,996 | 4/1992 | McGarvey | 220/565 X |

Primary Examiner—Steven M. Pollard
Attorney, Agent, or Firm—John R. Benefiel

[57] ABSTRACT

Inner and outer welded steel protective tanks are separated by a space containing a granular insulating material such as perlite preventing excessive heating of fuel in a storage space in the inner tank, even when there is a fire at the site. The inner tank may be subdivided into portions by a partition defining a storage space and an overfill containment space receiving overflow from the storage space portion, with a sensor detecting overflow. The overflow containment space is also arranged to collect separated fuel when the tank system is used with a vapor recovery system. The granular insulating material acts as an explosion suppressant by dissipating heat and fuel vapors which may be present in the insulation space as a result of leakage from the inner tank. A triple walled tank of increased reliability against spills and penetration resistance is provided by a two closely spaced inner tanks within the insulation. Insulated tank saddles provide fire protection for the tank support.

2 Claims, 8 Drawing Sheets

METHOD AND STORAGE TANK SYSTEM FOR ABOVEGROUND STORAGE OF FLAMMABLE LIQUIDS

CROSS REFERENCE TO RELATED CASES

This is a continuation-in-part of application Ser. No. 07/587,019, which was filed on Sep. 21, 1990, U.S. Pat. No. 5,251,473 and is entitled "Method and Storage Tank System For Above-ground Storage of Flammable Liquids".

BACKGROUND OF THE INVENTION

This invention concerns storage of flammable liquids such as gasoline, diesel, kerosene, lubricating oil, waste oil, solvents and other flammable liquids.

For many years, the usual practice has been to store these products in tanks located below ground level. This was done because underground tanks take less usable space, they are protected against collisions with motorized vehicles, they are less susceptible to vandalism, and they present less of a fire hazard. The disadvantage of underground storage is that if a leak occurs in the tank or its associated piping, it may be undetected for a long period of time, resulting in contamination of the surrounding soil. Leaking product may also diffuse through the soil to groundwater, resulting in the contamination of drinking water.

Because of this concern, federal, state, and local governments have passed regulations which require tank owners to install sensors for monitoring leaks, provide spill and overfill protection devices, improve tank and pipe construction, and demonstrate ability to pay for clean-up costs in the event of soil contamination. In some situations the regulations require the use of double-walled tanks and/or piping for underground storage. In this case, if the inner tank or piping fails, the product being stored is contained by the outer tank. Because the implementation of these requirements can be very costly, tank owners now have a strong incentive to store these flammable liquids in tanks which are located above ground.

The advantage of aboveground storage is that any leakage will be immediately apparent and corrective action can be taken before there is any substantial environmental degradation of the soil and ground water. Further, the piping associated with the tank may also be located above ground level so that a leak in the piping system would also be readily apparent. Because of these differences, aboveground tanks are not subject to the same strict requirements as are tanks located underground.

There are, however, a number of disadvantages with conventional aboveground storage as compared with underground storage. Because aboveground tanks are not surrounded by soil, there is more of a fire and explosion hazard. Aboveground tanks are subject to damage by collision with a motorized vehicle or other source, damage by vandals who might shoot at a tank, as well as being subject to the possibility of failure by developing a leak. If a tank were to fail due to any of these reasons, product would flow onto the ground, and depending on the size of the leak, it may flow away from the tank so as to cover a substantial area. If this liquid is ignited, a serious fire or explosion may result.

Because of this concern, conventional aboveground tanks storing flammable liquids are usually restricted from populated areas, and in addition, they are frequently surrounded with an external dike to contain the liquid within the dike. In some cases, conventional aboveground tanks are also fabricated with a double-wall construction in addition to, or as an alternative to, an external dike surrounding the tank.

If a conventional double walled tank or enclosing vault is used to reduce the hazards associated with conventional aboveground tanks, an explosion hazard can be created by the presence of heavier-than-air flammable vapors in the space between the inner tank and the enclosing vault or outer tank. Such vapors may result from spillage or leakage of fuel into that space. These vapors may form an explosive mixture creating considerable danger for a person checking the space for leakage.

If a conventional aboveground tank is exposed to a fire causing external heating of the tank, this heat is transferred to the flammable liquid contained in the tank. This heating will raise the vapor pressure inside the tank, and if the tank is not properly vented, the increased pressure can result in rupture of the tank. If the tank is vented to relieve this pressure, as these vapors leave the tank and mix with air, a combustible mixture is formed which may be ignited by the fire making it larger than it would otherwise have been. Further, wind may blow the burning vapors toward adjacent structures causing destruction of adjoining property.

Heating by direct flame impingement may also cause a reduction in the strength of the structural components of the tank, resulting in its rupture or the failure of its structural supports.

A further problem with conventional aboveground tanks is the diurnal heating of the tank during the day and cooling during the night. This heating and cooling results in what is known as tank "breathing" wherein the vapor pressure of the liquid in the tank increases during the day and decreases at night. As the temperature rises, the tank must be vented to prevent its being over pressurized. As a consequence, vapors in the tank are vented into the atmosphere resulting in atmospheric pollution. In a similar manner, when the tank cools during the night, air must be admitted into the tank to prevent its collapse. As this air is drawn into the tank, oxygen in the air mixes with the vapor already in the tank. Depending on the concentration of oxygen relative to the vapor concentration, an explosive mixture may be produced in the tank, which if ignited could result in the rupture of the tank through explosion. Oxygen and moisture drawn into the tank may also degrade the product contained in the tank.

Conventional vented aboveground tanks located in regions subject to high ambient temperature are capable of degrading the stored product, i.e., if the tank contents reach a temperature even as low as 80F., relatively volatile products such as gasoline are subject to evaporative degradation if exposed to these temperature conditions over a period of time, as little as a week. For a product containing a mixture of compounds, such as gasoline, the more volatile constituents evaporate leaving the less volatile compounds in the tank. After a period of time the product is no longer useful for its intended purpose.

Another disadvantage of conventional aboveground tanks in comparison with underground tanks in is the method of filling them. Underground tanks are commonly filled without their use of a pump, using gravity. Aboveground tanks are generally at the same level as the supply tank, so it is necessary to use a pump to transfer the product from the supply tank into the storage tank. Because of the possibility of overfilling the tank as a result of human error or equipment malfunction, it is highly desirable to provide contingency methods of preventing such overfill. Large tanks in particular are commonly filled at a high rate, and even a few seconds of inattention on the part of the operator could result in ten's if not hundred's of gallons of product flowing into the ground where it is both a fire and environmental hazard.

A tank system consisting of an inner tank surrounded by an enclosing concrete vault to protect the inner tank is currently in use. This tank system offers a degree of protection against collision and also provides some thermal insulation for the inner tank. However concrete has a tendency to form micro-cracks which prevent it from being acceptable as a material for constructing a leak-tight containment chamber. Because of this, these tanks do not offer true double-wall containment. Furthermore, a concrete vault cannot conveniently be tested for leaks. Also, the relatively great weight of a concrete vault greatly complicates its installation and substantially increases its installation cost. In addition, concrete decomposes in the intense heat of a fire, losing its structural strength. It is also subject to fracture if rapidly cooled such as by water from, a fire hose used in the process of extinguishing a fire.

In some regions of the country, there is currently a requirement for vapor recovery systems in which displaced vapor from the fuel tank of a vehicle receiving fuel dispensed from the tank is directed into the storage tank via an annular space in a coaxial fueling hose. Any liquid fuel inadvertently splashing into this annular space must be removed or the effectiveness of the vapor recovery system is greatly diminished. If the supply tank is located underground, this is accomplished by a liquid/vapor separation device-located at the bottom of the dispensing pump. The separated liquid flows by gravity back into the storage tank. Unless the liquid/vapor separation device is located on the top of the tank, this method does not work for a conventional aboveground tank because the level of liquid in the tank is higher than the liquid/vapor separation device. It is not convenient to locate the liquid/vapor device at the top of the tank because the dispensing pump will be so far above ground level that it cannot conveniently be reached. In addition, in order for the trapped liquid to reach the separation device, it is necessary that the return vapor force the trapped liquid, against gravity, from the level of the fill nozzle to the level of the liquid/vapor separation device at the top of the tank. This would cause increased back-pressure in the vapor return line, greatly diminishing the effectiveness of the vapor recovery system.

SUMMARY OF THE INVENTION

The present invention comprises a method and storage tank system for aboveground storage of flammable liquids which substantially alleviates the above problems.

The tank comprises inner and outer tanks each of welded steel construction to be able to be reliably tested for leaks, and each capable of fully containing the liquid product. An insulating layer is interposed between the tanks, comprised of a substantial intervening space between the tanks, filled with a solid or granular refractory insulation material. Weight-bearing insulation may be also provided between the structural supports holding the inner tank away from the outer tank.

The insulation layer reduces the rate of heat transfer from the outer tank to the inner tank and its contents. This insulation prevents the boiling of the inner tank contents over a prolonged period, even when the exterior tank is directly exposed to fire.

The insulation is also effective in substantially reducing the temperature fluctuations of the inner tank and its contents caused by the diurnal day/night ambient temperature fluctuations. With the temperature fluctuations of the inner tank and its contents being substantially eliminated, the "breathing" of the inner tank is diminished resulting in the substantial elimination of vapor emission from the inner tank to the atmosphere during daytime heating, and entrance into the tank of air during the cooling period of night. This reduces the fire hazard associated with these emissions, the change in tank contents due to selective evaporation, and atmospheric pollution caused by these vapors, as well as the possible degradation of the tank contents by the in-breathing of oxygen and water into the tank.

The granular insulating layer also functions to substantially reduce or eliminate the propagation of an explosion, should a mixture of combustible vapors and oxygen ever be introduced into the insulation space between the inner and outer tanks. This is accomplished because of the large surface area of the granular and also porous insulation. Because of this high surface area of insulating material, the temperature of burning vapor is quenched, not rising substantially above the temperature of the insulation. If the temperature of the vapor is quenched, the rate of combustion is greatly diminished and an explosion is prevented.

The insulation may alternatively consist of two composite layers in which an inner insulating layer having a high mass density and corresponding high heat capacity per unit volume as well as a low thermal diffusivity is surrounded in turn by a second insulating material. This second, outer layer of insulation has a lower mass density and associated heat capacity per unit volume as well as a low thermal diffusivity.

The space between the inner and outer tanks also provides mechanical protection to the inner tank. In the event the outer tank is deformed inward through collision or other means, deformation of the outer tank must substantially reach the extent of the space between the inner and outer tanks before the inner tank is deformed. This separation between the inner and outer tank walls is referred to as "crush" space.

This separation also provides an extra measure of protection against penetration of the tank system by bullets. The steel thicknesses of both the inner and outer walls can-be individually adjusted to provide the degree of protection required. Secondly, two layers of steel separated by the intervening insulation space provide far greater protection than one layer of steel having a thickness equal to that of the two layers. This is because the bullet expands, and in some cases disintegrates after passing through the first layer and consequently inflicts less damage to the inside steel layer.

Even if both the inner and outer tanks have been penetrated by bullets, this space still acts as a containment volume. The leak-free capacity of the containment volume depends on the location of the penetration. However, a liquid sensor may be placed at the bottom of this space so that if liquid is sensed, an alarm is triggered notifying the tank operator of the penetration. Because of the relatively large volume of this interstitial space in comparison with the volume of the inner tank, for most locations of tank penetration, ample time is available to effect repairs before a substantial quantity of liquid could leak from the outer tank penetration onto the ground In addition to the use of a refractory insulation in the space between the inner and outer tanks, there are several other elements comprising the insulation system. The support structure which supports the inner tank inside the outer tank is provided with insulation pads which are placed between the support structure and the outer tank. These support structures are typically welded to the inner tank, but are attached to the outer tank by means of insulated steel brackets. This arrangement reduces heating of the insulation by the steel support structure and it eliminates thermal conduction short circuits which would otherwise result from direct metal-to-metal contact from the outer steel tank to the inner steel tank.

A fire "skirt" may be attached to the outer tank, extending from the approximate mid-height of the tank to the ground. This "skirt" is optimally mounted so that either the top or the bottom and one of the two sides is free move as a result of thermal expansion and contraction. The purpose of this "skirt" is to substantially eliminate direct flame impingement on the lower portion of the external tank and also on the steel support structure for this tank. To accomplish this purpose, it extends downward fully to the support structure that the tank is resting on. This forms an enclosed volume defined by the support structure, the "skirt" and the lower portion of the outer tank which is substantially sealed against air infiltration.

As a further means of protecting the steel support structure of the outer tank in especially hazardous conditions, it may be further insulated by means of sprayed-on, bonded or mechanically fastened insulation.

The interior of the inner tank may be divided by a partial partition or bulkhead so as to create a relatively small volume overfill containment chamber, into which fuel flows when the primary storage space is filled past the height of the bulkhead. A primary liquid level sensor may be located in the primary volume of the tank. The level of this sensor is somewhat below the level of the top of the partial bulkhead to alert the liquid delivery person to cease filling the tank prior to reaching the top of the bulkhead. In the event the liquid flow was not stopped at this point, the volume of the overfill spill chamber is available to contain product which otherwise would overflow the tank. A secondary overfill monitor alarm detects the presence of a substantial volume of liquid in the overfill containment chamber. The alarm for this chamber would appropriately trigger a different signal and of higher intensity to more urgently inform the person filling the tank of an imminent overfill condition. This chamber is also optimally provided with an opening to provide a means of pumping liquid product from this chamber in the event it is accidentally partially or totally filled.

A liquid or vapor sensor may also be provided at the bottom of the insulation space between the inner and outer tank walls to detect the presence of liquid leaked out of the inner tank.

Any or all of these alarms may be associated with a modem device to transmit an alert to a remote location such as the tank owner or a fire station.

The inner and outer tanks are each provided with openings for vents having flame arresters to allow breathing of the tank due to moderate temperature fluctuations, as well as emergency blow-out vents to relieve higher vapor flow rates in the event of boiling fuel. Because of the presence of the insulation of the inner tank, the maximum flow capacity of both the normal and emergency vents could be reduced as compared to the situation with conventional uninsulated tanks, however inasmuch as tanks of the present invention may be exposed to more hazardous conditions or be required to satisfy a higher level of safety, conventional-sized vents are contemplated.

The tank system according to the present invention is also advantageously combined with vapor recovery dispensing systems. The efficiency of vapor recovery systems is seriously degraded if they must force vapor back into the storage tank against tank back pressure. The tank storage system of the present invention provides for reduced back pressure in comparison with conventional aboveground tanks because of the high degree of thermal insulation which minimizes the temperature rise of product in the tank during daytime heating conditions. This minimizes the product vapor pressure in the tank. Furthermore, the overfill containment chamber is also utilized as a collection tank, receiving fuel, by gravity, from the liquid/vapor separation device.

In the preferred embodiment a triple wall tank is provided in which two closely spaced or "tight wrapped" inner tanks are employed, completely enclosed in the insulation, an outermost third tank used to enclose the insulation. This three tank system reduces the probability of leakage into the insulation and also the escape of fuel altogether from the tank system. The triple thickness also improves overall penetration resistance of the tank.

The closely spaced inner tanks may be leak tested in the field by applying a vacuum to the intervening space, as via a leak sensor entry tube, which results in only minimal deflection of the tanks due to their minimal clearance therebetween, and avoids packing of the insulation as would occur by applying positive pressure to leak test.

The thermal characteristics of the tank is also improved by concentrating a greater proportion of the wall metal mass within the insulation, as the greater mass acts as a heat sink for absorbing heat transferred through the insulation.

A superior fire protection for the tank support is provided by a saddle design in which an enclosure box surrounds each saddle with a substantial space therebetween filled with insulation. This design is also cheaper to manufacture

DETAILED DESCRIPTION

In the following detailed description, certain specific terminology will be employed for the sake of clarity and a particular embodiment described in accordance with the requirements of 35 SC 112, but it is to be understood that the same is not intended to be limiting and should not be so construed inasmuch as the invention is capable of taking many forms and variations within the scope of the appended claims.

Figure 1:
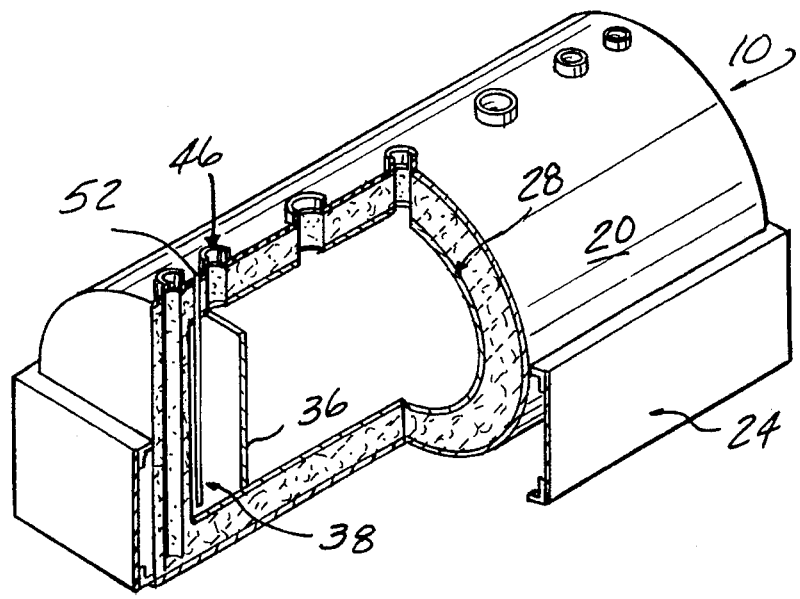
FIG. 1 is a fragmentary, isometric cut-away view of an aboveground storage tank according to the present invention.
Figure 3:
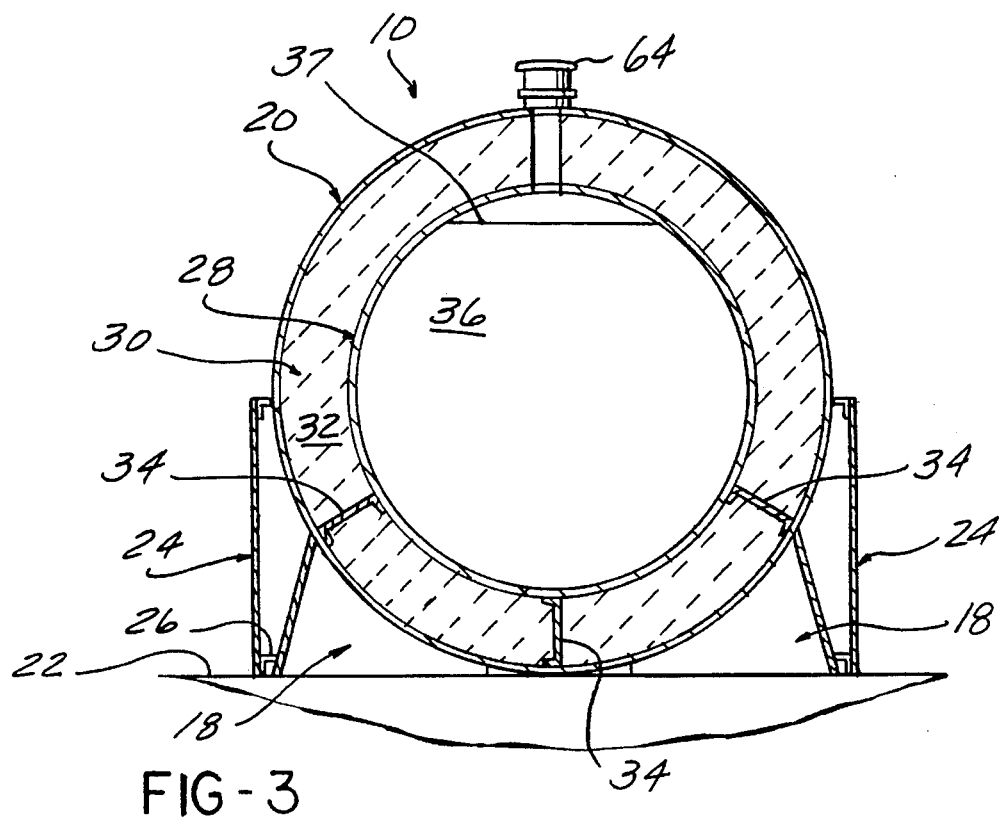
FIG. 3 is a transverse sectional view through the storage tank shown in FIG. 2.
Figure 2:
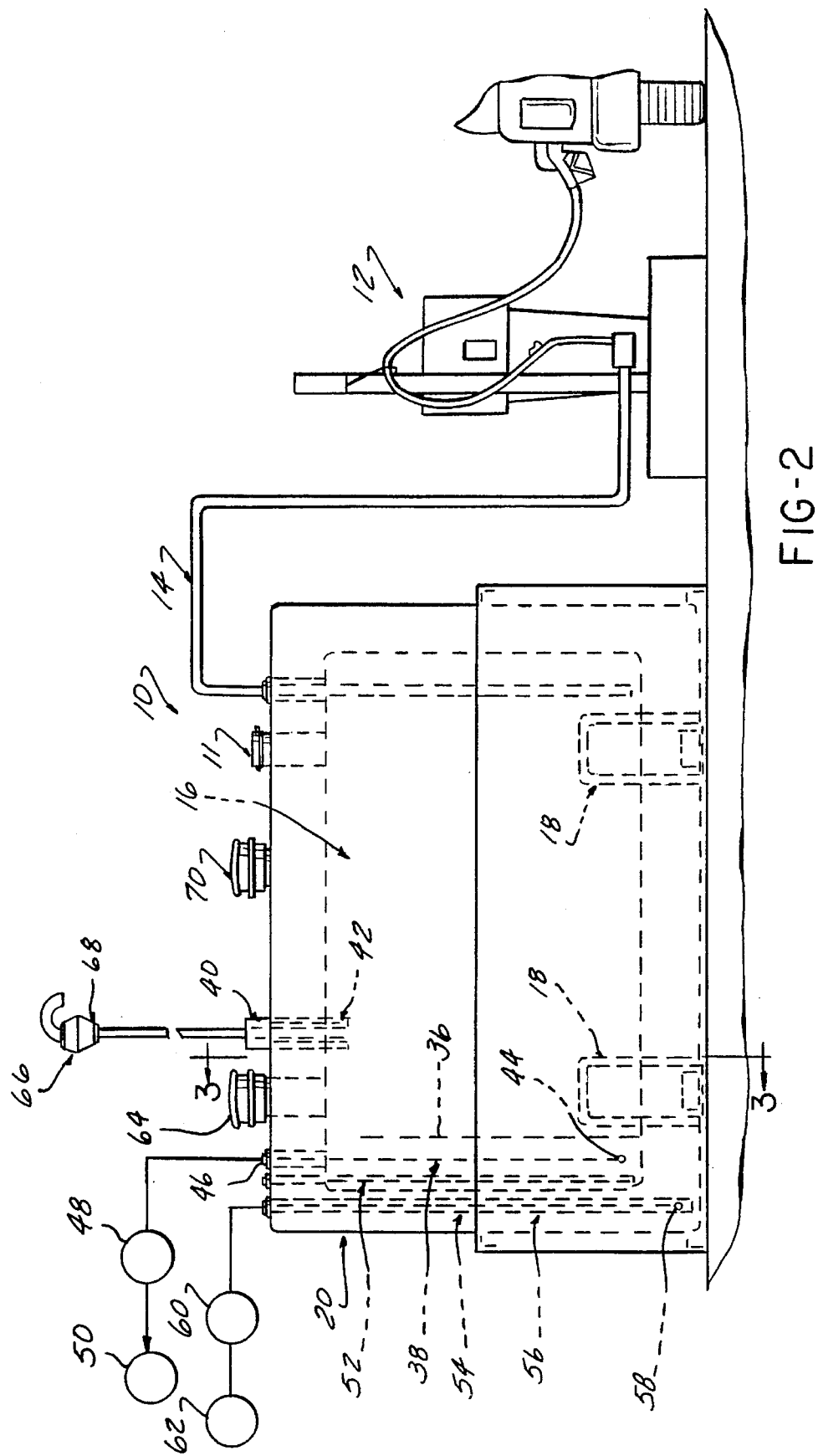
FIG. 2 is a side elevation view of the aboveground storage tank system according to the present invention and associated dispensing pump and plumbing, with a diagrammatic representation of associated monitor alarms.

Referring to the drawings and particularly FIGS. 1 and 2, the fuel storage tank 10 according to the present invention is designed for an aboveground installation as shown, and in particular, at a location where there is a particular concern over fire hazard. As a further example, it is suited for use as a fuel storage tank located adjacent to a dispensing pump mechanism 12 adapted to fuel a vehicle V as shown.

Figure 7:
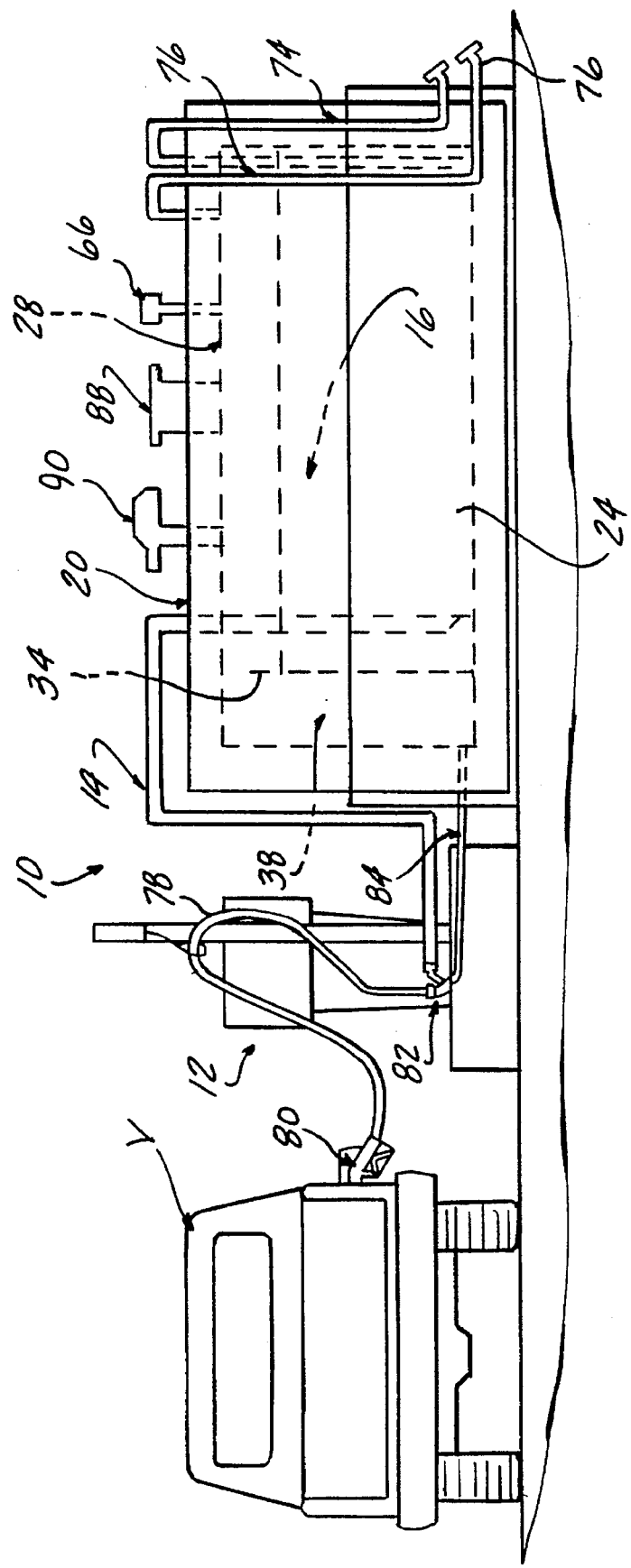
FIG. 7 is a diagrammatic side elevation view of a secondary vapor recovery system and a fuel storage tank according to the present invention combined therewith.

A suitable supply line 14 extends from an interior storage space 16 to the dispenser pump mechanism 12. The tank is filled through the fill opening 11. Alternatively, piping may be used to extend the fill from the opening 11 to a ground-level fill position as shown in FIG. 7.

The fuel storage tank 10 is of generally cylindrical shape, with support saddles 18 supporting the welded steel outer tank 20, the saddles 18 maintaining the tank position on a supporting surface 22.

Skirting 24, may surround the entire bottom half of the outer tank 20, protecting the saddles 18 and lower region of the tank 10 from direct flame impingement which could cause excessive heating and thermal stresses to develop and cause rupturing of the outer tank 20. The skirting, 24, comprises sheet metal panels which may optimally be attached to the tank in such a manner that either the upper or lower edge and one of the two side edges is free to, expand and contract. This minimizes deflection of the skirting 24 as a result of thermal expansion and contraction as might be experienced during a fire.

Figure 8:
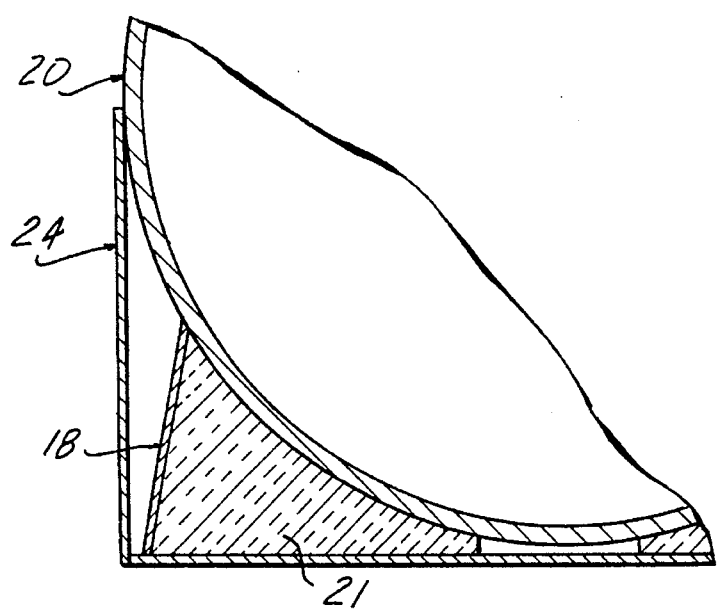
FIG. 8 is a transverse view showing support structure for the outer tank, including insulation of same.

A coating insulation 21 shown in FIG. 8 may be applied to the steel support structure for the outer steel tank to provide a further level of thermal insulation which could otherwise degrade the steel strength in extreme fire conditions.

A generally cylindrical welded steel inner tank 28 is enclosed within the generally cylindrical outer tank 20 with an intervening insulation space 30 between the two tanks about the entire perimeter and at either end thereof. Alternatively, the inner tank may be of cylindrical cross sectional shape surrounded by an outer tank of rectangular or square cross sectional shape, or the inner tank may be of square or rectangular cross sectional shape surrounded by an outer tank of square or rectangular cross sectional shape.

The insulation space 30 is substantial, on the order of eight inches, and the space 30 may be filled with granular low-density refractory insulation material such as a mass of expanded perlite 32.

The inner tank 28 is preferably not fixedly attached to the outer tank 20 by direct metal-to-metal contact, but is separated from it by a series of structural supports which support the weight of the inner tank and its contents.

Figure 9:
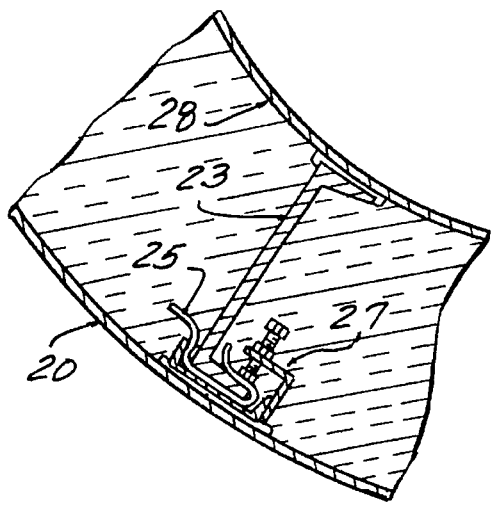
FIG. 9 is an enlarged view of the support structure for the inner tank.

As shown in FIG. 9, these steel structural supports 23 are fixedly attached to the inner tank 28, but are separated from the outer tank 20 by one or more sheets of insulating material 25. The inner tank 28 is kept in alignment with respect to the outer tank 20 by a series of brackets 27 welded to the outer tank 20, which lock the steel supports 23 in position. However these brackets 27 do not directly contact the inner tank supports 23 making a metal-to-metal contact but rather have the insulating sheets 25 interposed. This arrangement, in addition to reducing the conductive pathway for transmission of heat into the inner tank 28, also allows for thermal expansion of the outer tank 20 while the inner tank 28 remains at a constant temperature.

Many other arrangements for supporting the inner tank 28 with the outer tank 20 are of course possible.

A major proportion of the interior volume of the inner tank 28 comprises the storage space 16, but the interior may, optionally, be subdivided by a partition 36 extending to a height slightly below the full height of the inner tank 28. This partition may be fabricated by inserting a full partition and cutting a hole in its upper portion or by inserting a partial partition whose top surface does not extend to the top of the inner tank. The presence of the partition 36 subdivides the interior of the inside tank into the primary storage space 16 and an overfill containment chamber 38 which receives additional filling flow after the primary storage space 16 has been filled to its maximum capacity. The overflow passes through the opening at the top of the partition 36 into the overfill containment chamber 38.

The filling of the storage space 16 is normally stopped before overfill has occurred, as by the aid of a sonic liquid level sensor 40 triggered when the liquid level in the primary storage space 16 reaches a predetermined level somewhat below the bottom of the opening in the partition 36.

Sonic signaling device 40 is sounded by venting of vapors during filling through a tube 42 which terminates at the desired maximum fill level. Thus, when sounding stops, the tank truck operator will be alerted that the storage tank has been filled to its maximum normal level.

For tanks in which the fill opening is piped down to a level close to ground level, a liquid level sensor placed in the primary chamber 16 may be used to close an electrically actuated solenoid valve placed in series with the fill pipe 74 between the storage tank 10 and the tank being used to fill the storage tank. Optimally, this solenoid valve is of the "normally closed" type in which it is necessary to have electrical power available as well as the level sensing switch closed to open the solenoid valve.

An additional overfill alarm or sensor 44 may be located within the overfill containment chamber 38, with electrical leads entering through an external port 46 in the outer tank 20. The sensor 44 may be a conventional liquid detector triggered by partial filling of the containment chamber 38. Optionally, a modem device 48 may be employed for transmitting over telephone wires to trigger an alarm 50 at a remote location such as a fire station or in the office of the tank owner.

A pump-out standpipe 52 can also be provided, allowing the containment chamber 38 to be emptied if an episode of overfill has occurred.

A containment monitor tube 54 is also provided which extends into the interstitial space 56 between end walls of the outer tank 20 and the inner tank 28, respectively. The lower end of this tube can be provided with a screen covering the end to prevent insulation from entering the tube but allowing passage of liquid. A sensor 58 can be lowered into the tube 54, or the space may alternatively be visually inspected by the tube 54 to provide a means for monitoring the space 56 for the presence of flammable fluid. The presence of fuel in the interstitial tank space 56 indicates a leak in the inner tank 28, liquid from which will be contained in the outer tank 20 until the damage is repaired.

Alternatively, a permanently installed sensor 58 can be connected to a modem 60, triggering an alarm 62 at a remote location such as a fire station or in the office of the tank owner.

The granular expanded perlite, if of a sufficiently small size and porosity, i.e. less than 75 mesh, will act to a substantial degree as an explosion suppressant by effectively quenching combustion through the mechanism of thermally heat sinking the vapor to the temperature of the insulation. Depending on the exact composition and physical structure of the insulation medium, this suppression may be of partial or complete extent.

In the case Where the suppression is only partial, the improvement can occur by reducing the range of mixtures of flammable vapor and oxygen in which explosion is possible as well as reducing the intensity of explosion. Thus, the potential for damage occurring from an explosion in the interstitial space between tanks is greatly reduced.

The inner tank 28 is provided with an emergency vent 64 venting vapors which would otherwise result in the overpressurization of the this tank. A normal vent 66 allows breathing due to gradual temperature swings as occur from night to day ambient conditions and also provides a path for vapors to leave the tank if it is being filled with liquid and a vapor recovery system is not employed.

An opening for a spark arrestor 68 is provided for this vent. The high level of insulation provided will normally keep venting due to ambient temperature fluctuations to an absolute minimum. An opening for an outer tank emergency vent 70 is also provided to protect this tank from overpressurization. This vent is provided for contingency protection in the event there is rapid heating of the outer tank from external fire exposure to the outer tank after failure of the inner tank which has leaked liquid into the interstitial space between the tanks. This vent 70 is also provided to release steam which could be released after an extended intense fire exposure if the insulation employed a layered insulation (FIG. 6) in which the inner layer comprised a material with chemically bound or adsorbed water.

Figure 4:
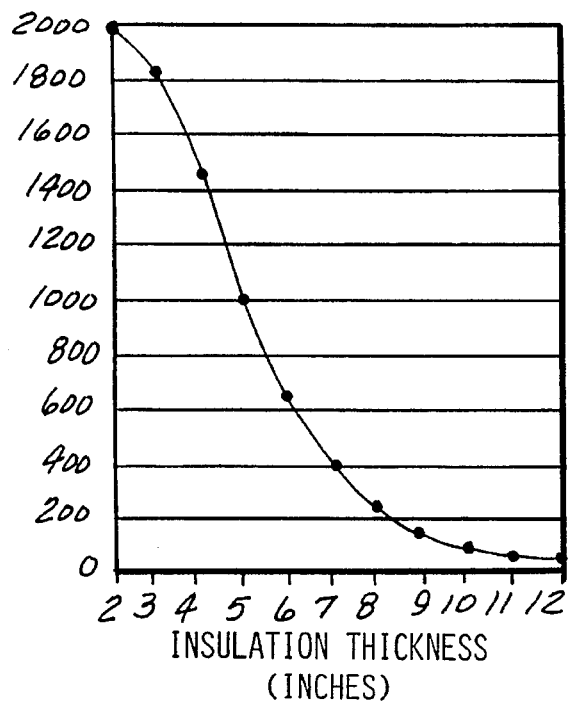
FIG. 4 is a graph of the temperature of the interior tank after two hours of fire testing for various expanded perlite insulation thicknesses.
Figure 5:
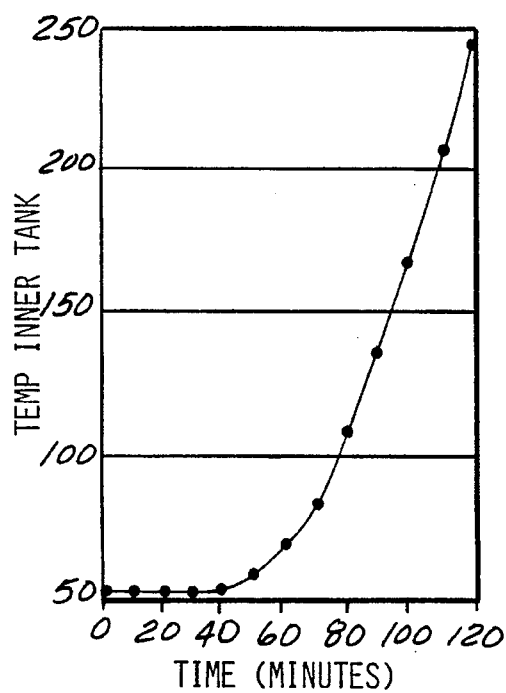
FIG. 5 is a graph of the temperature of the inner tank with 8-inches of low-density perlite insulation, versus time of exposure of the outer tank at a temperature of 2000° F., in minutes.

FIGS. 4 and 5 show that with eight inches of expanded perlite, it will take approximately one and one half hours for the inner tank 28 to reach the normal boiling point of gasoline, about 135F.

Figure 6:
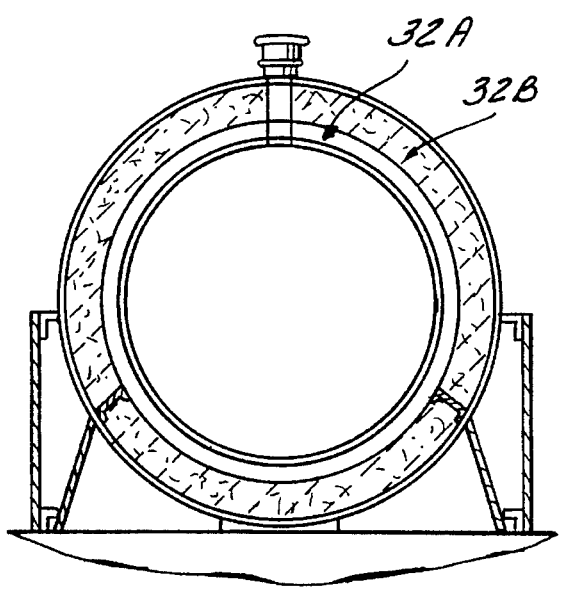
FIG. 6 is a transverse sectional view through a storage tank of an alternate embodiment of the present invention.

An alternative insulating arrangement is shown in FIG. 6, in which two layers of differing insulation are used to envelope the inner tank. The inner layer of insulation 32A consists of a material having a high mass density (which contributes to a high specific heat per unit volume) as well as a low thermal diffusivity. In the remaining space, between the outer tank and the outer surface of the inner layer of insulation, a layer of a second insulation material is employed 32B. This material optimally will have a low mass density (which contributes to a low specific heat per unit volume) and a low thermal diffusivity. By insulating the space between the inner and outer tanks in this manner, a high degree of thermal protection may be provided to the inner tank and its contents while at the same time minimizing the weight of the insulation. This innermost layer 32A may be an inert, heavy material such as concrete or dry sand. The outer layer of insulation may be a light-weight material such as expanded perlite.

Alternatively, the insulation may also include a composite layering, in which an inner insulating layer consists of a material containing adsorbed or chemically bonded water, for example, materials with waters of hydration. These insulating materials have the property that as the temperature is increased, a range of temperatures is reached, typically in the temperature range of the boiling temperature of water, where the bound or adsorbed water is liberated from the material and leaves the insulating material. As the temperature rises through this temperature range, a large quantity of heat energy is absorbed by the insulating material with minimal increase in temperature. The outer layer of insulating material surrounding the inner layer consists of a material having the physical properties described above for the alternate layered outer insulation, namely a low mass density and a low thermal diffusivity. Examples of inner insulating materials include natural or synthetic hydrophilic zeolites having been loaded with adsorbed water, and materials such as concrete which have chemically bound water. Examples of outer insulating materials are expanded perlite and vermiculite.

In these examples, these outer insulating layers provide thermal insulation while minimizing the overall weight of the insulation. The inner insulating layer may not have as low a thermal conductivity as the outer layer, but it has a high heat capacity per unit volume. This inner layer, by virtue of its high specific heat per unit volume, has the property of absorbing a relatively large amount of thermal energy which diffuses through the outer insulating layer. The combination of these two insulating materials results in an insulating system combining the two features of high resistance to temperature rise of the inner tank and its contents as well as minimum weight of insulating material.

FIG. 7 illustrates the combination of the present invention with Stage I and Stage II vapor recovery. The fill tube 74 terminates at a level convenient for attaching the delivery tube from the supply tank. Closely adjacent is the stage I vapor collection tube 76 used in the manner well known to those skilled in the art.

A spring-loaded manhole cover 88 and a pressure-vacuum vent 90 are also provided in this embodiment, communicating with the interior of the inside tank 28.

The dispenser pump 12 is equipped with a coaxial fueling hose 78 and nozzle 80 in which fuel flows through an interior central passage and vapor is returned through an annular surrounding space, in the manner well known in the art.

A vapor-liquid separator 82 allows removal of any splash of liquid fuel into the annular, coaxial space, and according to one aspect of the present invention, this liquid fuel is returned to the overfill containment compartment 38 via a sloping small diameter pipe or hose, 84. This arrangement allows disposal of the liquid fuel in a secure storage space, i.e. the interior of the tank 10 according to the present invention.

Figure 10:
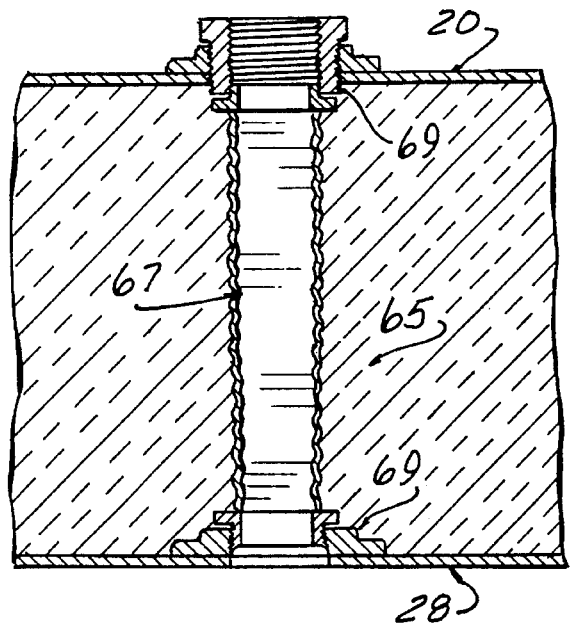
FIG. 10 is a diagrammatic side view of a flexible coupling between the inner and outer tanks.

Externally accessible openings from the inner tank may be made using bellows-type couplings 65 as shown in FIG. 10. These couplings comprise of a length of corrugated expandable tubing 67, secured at either end with threaded fittings 69. This connection offers the benefits of a higher thermal resistance because of their smaller wall thickness in comparison with standard pipe, and also provide a flexible joint so that motion of the inner tank 28 relative to the outer tank 20 due to thermal expansion can be easily accommodated without mechanical failure.

Figure 11:
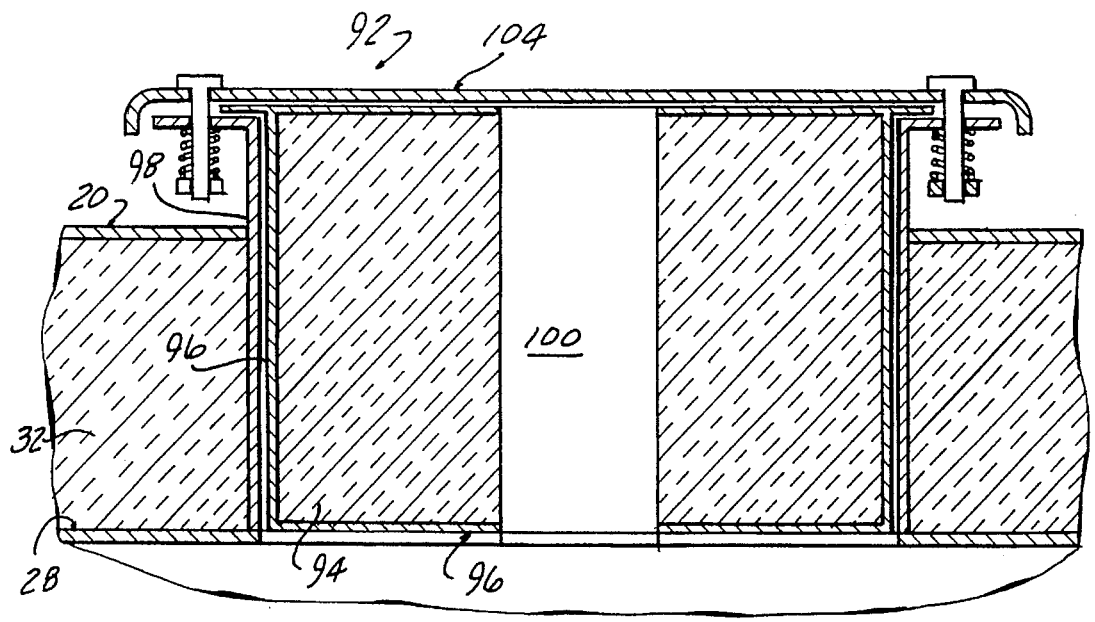
FIG. 11 is a transverse sectional view of an insulated spring-loaded manhole emergency vent for the inner tank.
Figure 12:
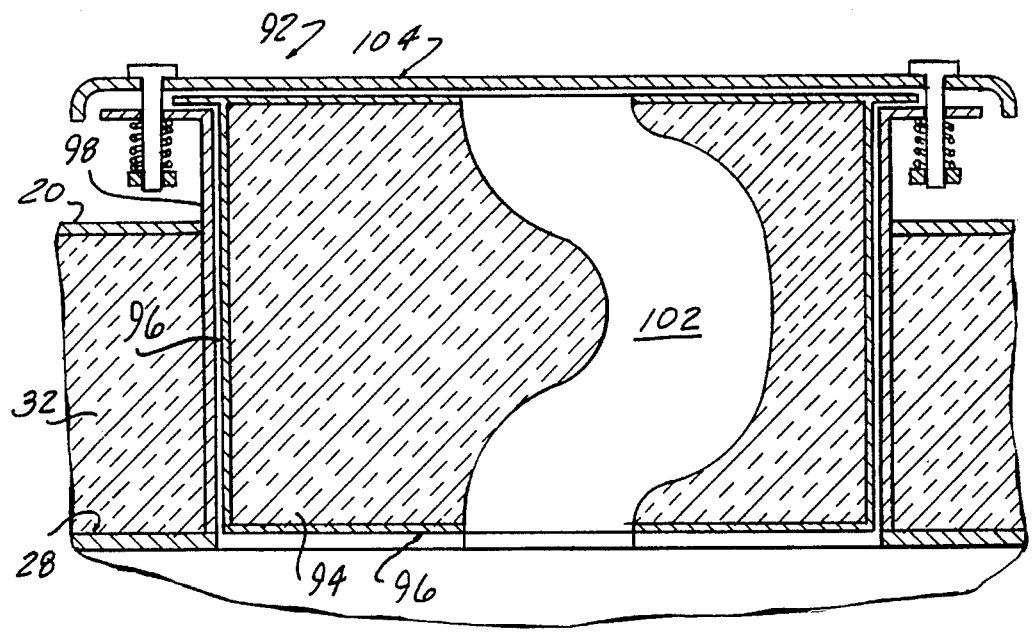
FIG. 12 shows an alternative embodiment of an insulated, spring loaded manhole emergency vent for the inner tank.
Figure 13:
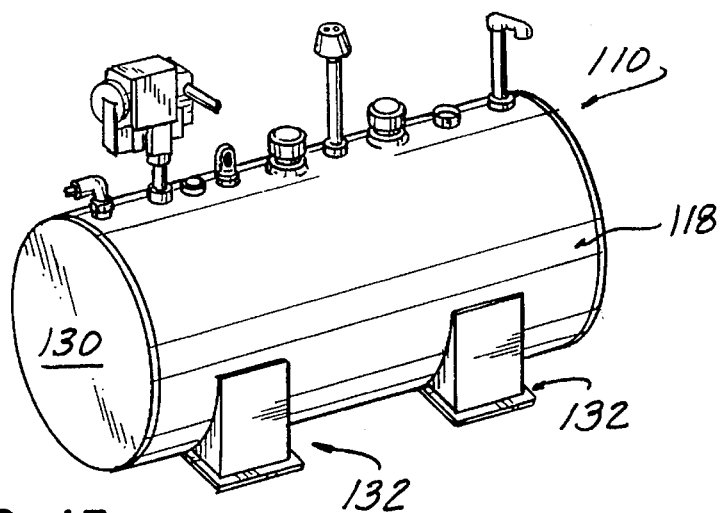
FIG. 13 is a perspective view of a preferred embodiment of a fuel storage tank having insulated saddle supports.
Figure 14:
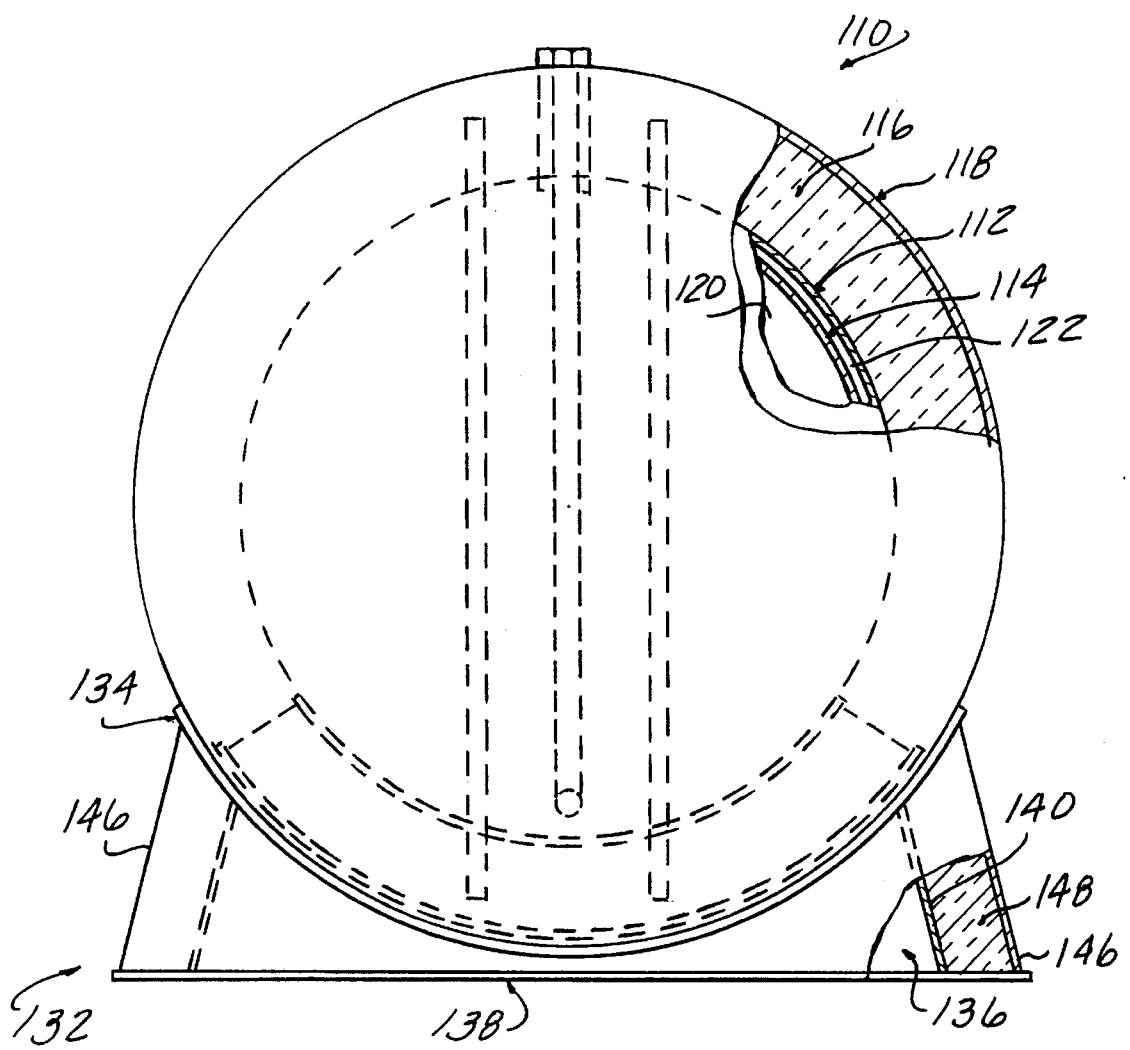
FIG. 14 is an end view of the fuel storage tank shown in FIG. 12, partially broken away.

The emergency vent opening for the inner tank may be of a threaded or flanged pipe fitting to which an accessory emergency vent it attached, or for larger tanks, it may be of the spring-loaded manhole type. FIGS. 11 and 12 are fragmentary sectional views of such spring-loaded manholes 92, showing an insulating mass 94 within a container 96 fit within a flanged pipe 98 inserted into the outer tank 20 and inner tank 28. An opening, either straight 100 (FIG. 11) or curved 102 (FIG. 12) provides a path for vapors to pass from the tank cavity 16 to the atmosphere. A spring-loaded lid 104 covers the opening 100 or 102, allowing venting of vapors when an over pressure condition occurs.

Another embodiment is shown in FIG. 13–17, which embodiment offers advantages over the above described design, and hence is preferred.

In the above design, the double wall provides increased assurance that leaks will not cause spills and increases the penetration resistance of the tank. The outer tank also acts to contain the insulation.

However, if a leak in the inner tank occurs, the insulation will be soaked and become ineffective in the case of a fire.

Also, the fire skirt used to protect the saddles is a relatively expensive and bulky structure.

In the preferred embodiment of FIGS. 13–17, a triple walled tank 110 is provided, in which two "tight wrapped" inner tanks are surrounded by a thick mass of insulation, confined by a relatively light weight outermost tank.

This greatly reduces the likelihood of a leak ruining the insulation and reduces the overall probability that a leak will result in an environmental spill.

The triple walled tank 110 includes closely spaced primary and secondary inner tanks 112, 114 enclosed within an insulation space 116 containing a mass of granular insulation of the type described above.

The outer most tank 118 primarily acts to confine the insulation and hence can be of lighter weight than the primary and secondary inner tanks 112, 114, which are mainly relied on to provide confinement of the fuel stored in the storage space 120 defined by the interior of the primary inner tank 114.

The two inner tanks 112, 114 are of "tight wrapped" construction, a known process for producing conventional double walled close fit fuel storage tanks. This results in the two tanks 112, 114 having minimal clearance space 122 between each other.

This provides a greatly reduced possibility of leakage into the insulation, as leakage of the primary inner tank 114 will be confined in the secondary inner tank 112.

This arrangement also greatly facilitates field leak testing of the inner tanks 112, 114 by applying a vacuum to the clearance space 122. This causes expansion of the primary inner tank 114 and contraction of the secondary inner tank 112, but due to the slight clearance of the space 122, the collapsing and expanding forces are neutralized by adjacent portions of the respective inner tanks 112, 114 being brought into contact. The extent of deflection will be minimal as a result.

This method of leak detection also avoids compression of the insulation in the space 116 as would occur by pressure testing in a single inner tank, or by pressure testing the outer tank 116 causing expansion of a single tank, while also avoiding any possibility of collapse as could occur as a result of the use of a partial vacuum in a single tank.

Figure 15:
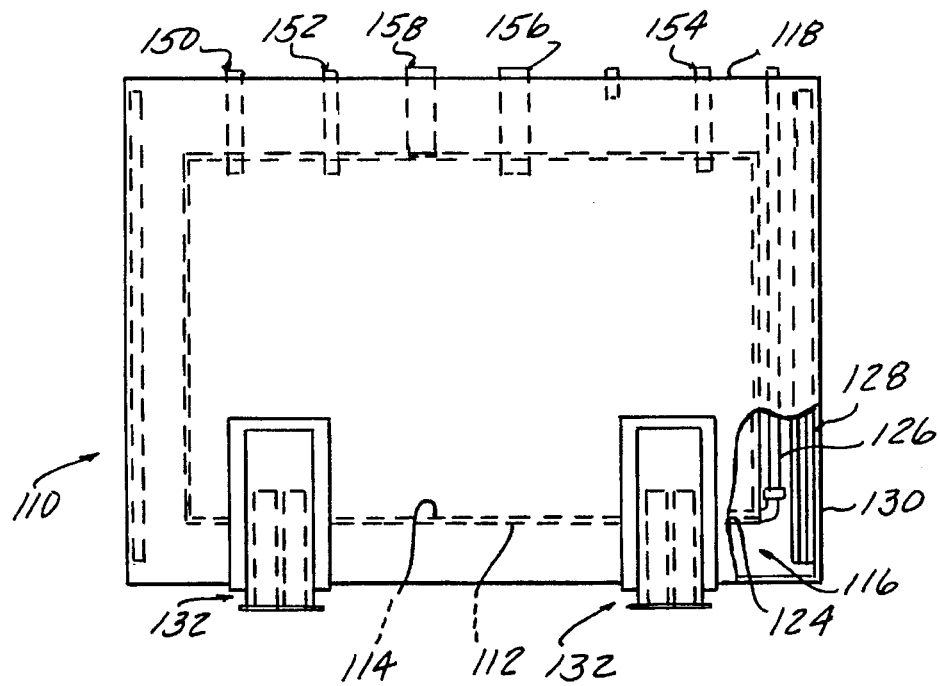
FIG. 15 is a side elevational view partially broken away of the fuel storage tank shown in FIGS. 13 and 14.
Figure 16:
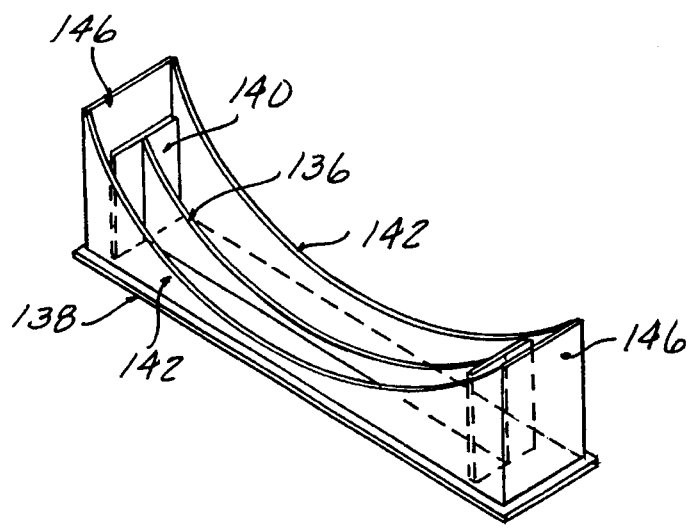
FIG. 16 is a perspective view of a gusset saddle and insulation enclosure box incorporated in the fuel storage tank of FIGS. 13–15.
Figure 17:
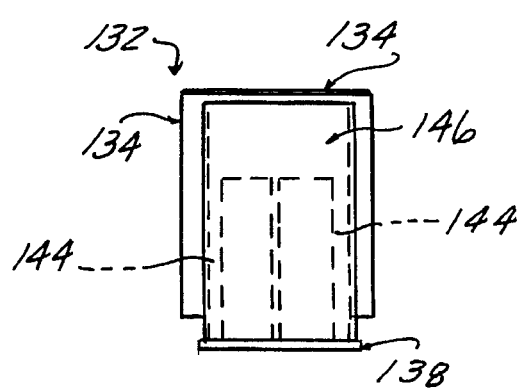
FIG. 17 is an end view of the gusset saddle and insulation enclosure box of FIG. 16.

The minimal volume of the clearance space 122 also aids in detection of leaks in the primary inner tank as by a leak monitor probe 124 inserted in space 122, with electrical leads routed through a pipe 126 extending within the insulation space 116 (FIG. 15).

As shown in FIG. 15, end plate stiffener channels 128 may be welded into the ends of the outermost tank 118. These stiffeners reduce deflection of the heads of the outermost tank if it is pressure tested by applying a pressure in excess of atmospheric pressure in the insulation space 116.

Alternatively, leak testing of the outermost tank 118 can be carried out by placing the same in a rigid fixture confining the same to prevent excessive distortion. Field testing may be omitted since the presence of the two inner tanks 112, 114 reduces the chance of leakage sufficiently.

The arrangement of the two inner tanks 112, 114, and the lighter weight outer most tank 118 has the effect of concentrating as a greater proportion of the thermal mass of the steel of the tanks within the surrounding insulation, as compared with a single tank. This has the effect of further lengthening the time interval after which the temperature of the stored fuel reaches excessive levels when the tank 110 is exposed to fire.

A further advantage is achieved by dividing the thickness of metal into three layers, in that resistance to ballistic penetration is thereby made greater.

In this embodiment, overfilling an internal overflow compartment is not included. Instead, a float controlled overfill valve (not shown) may be incorporated.

According to another aspect of the preferred embodiment of FIGS. 13–17 a pair of tank insulated saddle supports 132 are provided which are employed rather the fire skirt of the above described first embodiment.

Each insulated saddle support 132 includes a doubler strip 134 welded about the lower circumference of the outer tank 118, with an upright center gusset plate 136 welded to the doubler 134 and a base plate 138. A pair of transverse saddle end plates 140 are welded to either end of the center gusset plate 136 as well as to the doubler strip 134 and base 138.

An outer enclosure is formed by a pair of side plates 142 spaced outwardly from the center gusset plate 136 fit and welded to the doubler strip 134 and the base 138. The spacing is sufficient so that a gap 144 is left between each of the end plates 140 and the inside of each of the side plates 142 to prevent a metal heat conduction path from the exterior.

A pair of enclosure end plates 146 spaced outwardly from the end plates 140 of the center gusset plate 136. This creates spaces completely surrounding the center gusset plate 136 providing a saddle support for the tank 110. These spacers are filled with a granular insulation 148 to prevent the center gusset plate 136 from reaching a temperature at which structural weakening occurs.

A fill tube 150 pump withdrawal tubes 152 extend into the primary inner tank 112, as does a tank gauge tube 154.

A normal and emergency vent 156 (having a flame arrester extends into the primary inner tank 112, as does a normal and emergency vent 158 (also having a flame arrester) extending into the space 122 within the secondary inner tank 114.

The primary inner tank 112 is of maximum thickness typically required by regulations concerning fuel storage tanks. This thickness increases with increasing size, a typical range being 10 gauge to 2 gauge for capacities ranging from 1000 to 10,000 gallons.

The secondary inner tank 114 may be of lighter weight, as is also true of the outermost tank 118. A minimum thickness of 10 gauge is usually the thinnest practical thickness to avoid denting during handling.

I claim:

1. A method of constructing a storage tank for storing liquid petroleum fuels for dispensing into vehicles comprising the steps of:

constructing an inner tank of two separate tight wrapped tanks having a minimal clearance space therebetween;

installing insulation about the exterior of said inner tank;

enclosing said inner tank and insulation in a leakproof outer tank completely surrounding said inner tank with an intervening space therebetween within which is disposed said insulation;

leak testing said inner tank after said insulation is installed by applying a vacuum between said two separate tight wrapped tanks comprising said inner tank, drawing said two tight wrapped tanks into contact with each other to neutralize pressure forces acting on said inner tank and limiting expansion and contraction thereof respectively, whereby expansion of said inner tank tending to compress said insulation during leak testing is prevented.

2. The method according to claim 1 further including the step of sensing the presence of liquid in the space between said two separate tightly wrapped tanks and triggering an alarm in response thereto.

* * * * *